United States Patent [19]

Petrossian et al.

[11] Patent Number: 4,910,591
[45] Date of Patent: Mar. 20, 1990

[54] SIDE AND REAR VIEWING APPARATUS FOR MOTOR VEHICLES

[76] Inventors: Edward Petrossian; Ashkhen A. Petrossian, both of 1140 Elm Ave., Apt. #111, Glendale, Calif. 91201

[21] Appl. No.: 229,812
[22] Filed: Aug. 8, 1988
[51] Int. Cl.⁴ .............................................. H04N 7/18
[52] U.S. Cl. ..................... 358/103; 354/81; 354/293; 358/108; 358/229
[58] Field of Search ............ 358/108, 229, 103; 354/81, 293

[56] References Cited

U.S. PATENT DOCUMENTS

| | | | |
|---|---|---|---|
| 3,176,602 | 4/1965 | Wilt | 354/81 |
| 3,689,695 | 9/1972 | Rosenfield | 358/108 |
| 4,029,246 | 6/1977 | Woodruff | 354/293 |
| 4,093,364 | 6/1978 | Miller | 354/81 |
| 4,214,266 | 7/1980 | Myers | 358/108 |
| 4,277,804 | 7/1981 | Robison | 358/108 |
| 4,383,626 | 5/1983 | Weinblatt | 224/275 |
| 4,420,238 | 12/1983 | Felix | 354/81 |
| 4,615,597 | 10/1986 | Burriss | 354/293 |
| 4,635,110 | 1/1987 | Weinblatt | 358/254 |

Primary Examiner—Howard W. Britton
Attorney, Agent, or Firm—William W. Haefliger

[57] ABSTRACT

Apparatus permitting viewing of traffic conditions to the rear and side of a motor vehicle, which has opposite sides, comprises:
(a) first and second video cameras and first and second display terminals having video screens, the cameras connected to the screens, respectively,
(b) the first and second cameras mounted to the vehicle at the respective opposite sides thereof, the cameras directed generally toward the rear of the vehicle,
(c) and the screens carried by the vehicle proximate the driver's position, to be viewed by the driver in that position.

14 Claims, 2 Drawing Sheets

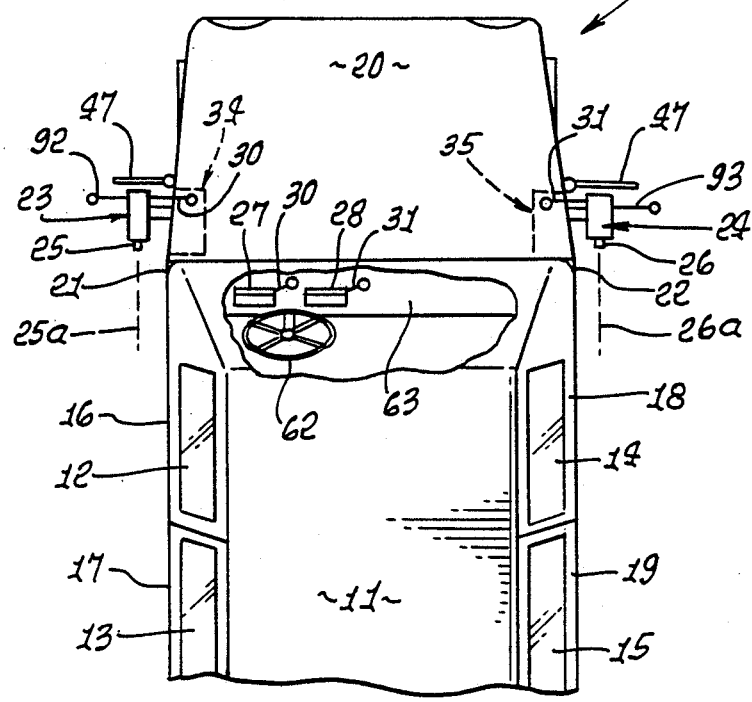
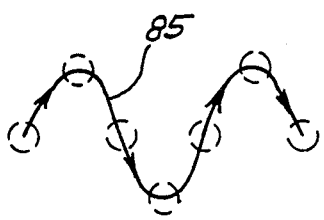
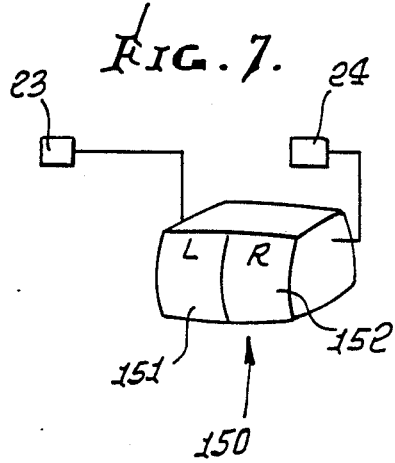
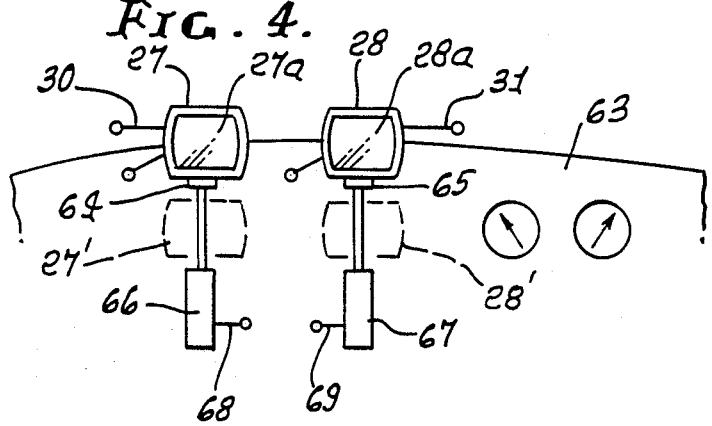
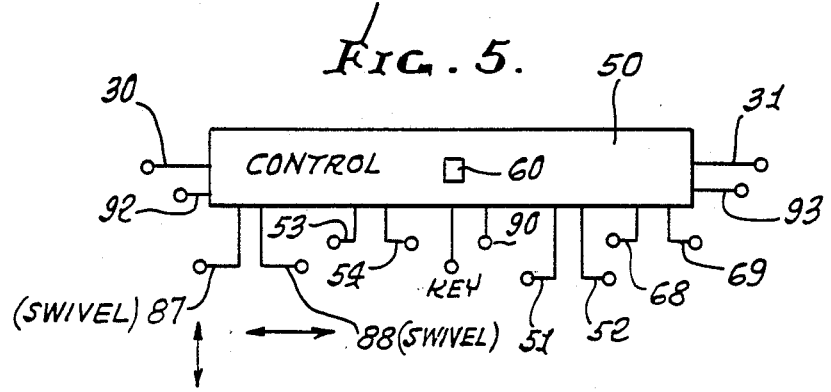

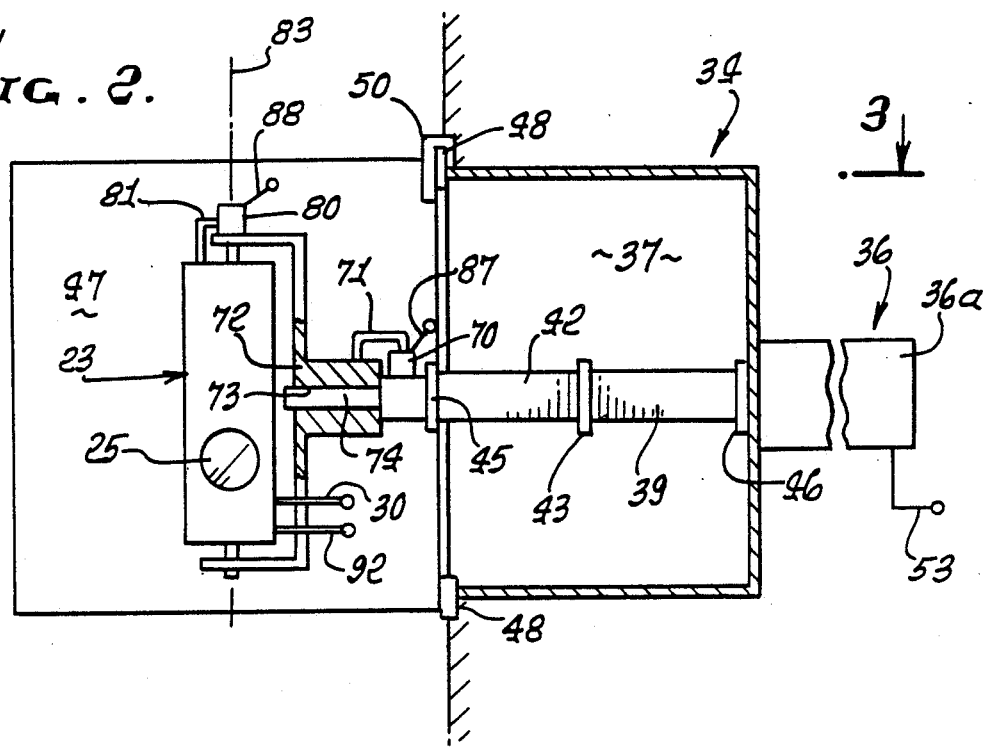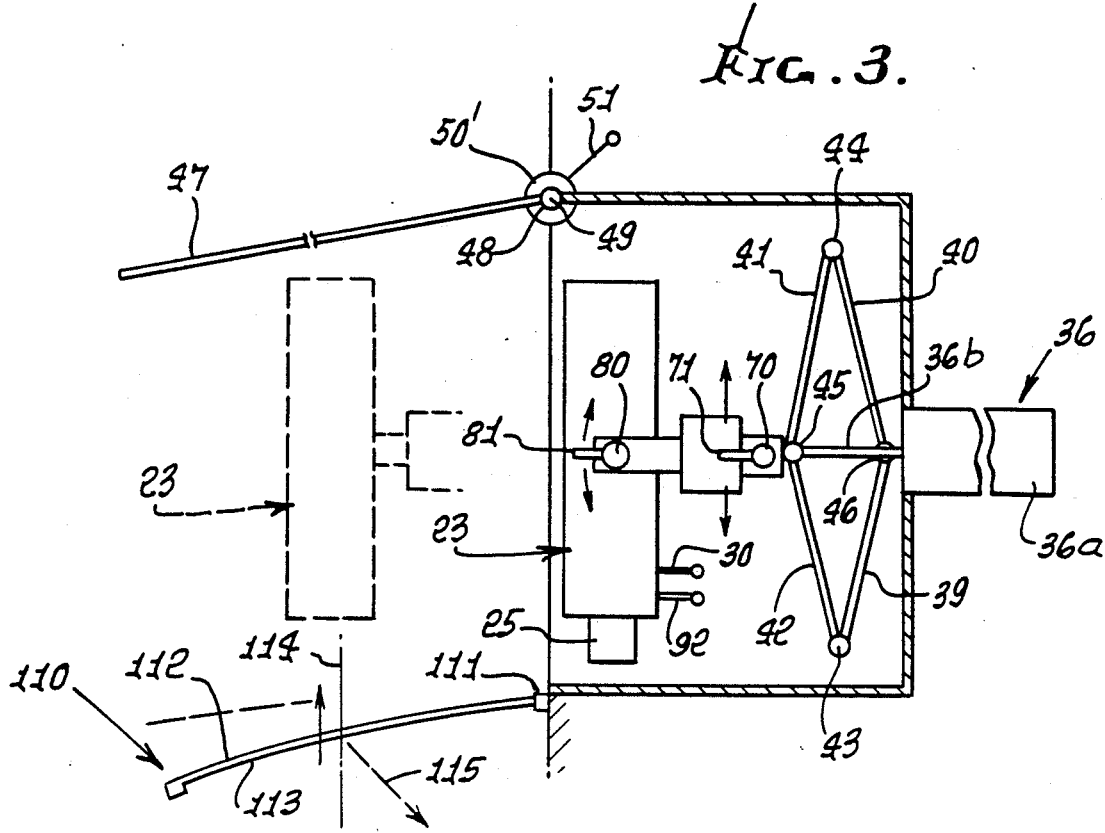

4,910,591

SIDE AND REAR VIEWING APPARATUS FOR MOTOR VEHICLES

This invention relates generally to rearward viewing from vehicles, such as trucks, autos, etc.; more particularly it concerns viewing of traffic conditions to the rear of and at both sides of such vehicles.

There presently exists need for the following:

A. Elimination of need for the driver of the motor vehicle to turn his head left or right while changing lanes in order to spot vehicles on either side which would otherwise be invisible;

B. Elimination of need for the driver to turn his head left or right while changing lanes, so that the driver can concentrate and observe vehicles ahead, to thereby eliminate the risk of colliding with the vehicle ahead;

C. Need for enhanced comfort in driving, with knowledge of nearby traffic;

D. Need for constant driver awareness of vehicles driving on either side of his vehicle;

E. Need to make driving for the elderly and the handicapped easier, more comfortable and less cumbersome;

F. Specifically, trucks, semi-trailers and heavy vehicles will benefit tremendously as the need for two or three different type mirror on either side of the vehicles will totally be Such mirrors are curved differently and drivers have difficulty in visually adjusting to them.

G. Need to supplement information provided by mirrors on either side of the vehicles;

H. Need to make accurate evaluation of distances of other vehicles on either side of the driver, using miniature T.V. screens, as opposed to the present distorted and inaccurate distance reflected on concave or convex side-mirrors;

I. Need to reduce risk of accidents.

SUMMARY OF THE INVENTION

It is a major object of the invention to provide apparatus meeting the above needs. Basically, the apparatus permits clear viewing of traffic conditions to the rear of the vehicle, without distortions as are introduced by wide angle mirrors. The apparatus comprises, basically, the following:

(a) first and second video cameras and first and second display terminals having video screens, the cameras connected to the screens, respectively, (b) first and second means mounting the first and second cameras to the vehicle at the respective opposite sides thereof, the cameras directed generally toward the rear of the vehicle, (c) and third and fourth means mounting the screens to the vehicle proximate the driver's position, to be viewed by the driver in said position.

It is another object to provide improved apparatus wherein at least one of said first and second mounting means includes swiveling means to swivel the associated camera in at least one of the following modes:

(i) up and down
 (ii) side to side

Preferably, both of the cameras are swiveled, as described.

It is a further object to provide improved apparatus wherein the first and second mounting means include actuators connected with the cameras to bodily move the cameras toward and away from the sides of the vehicle. In this regard housings may be provided at opposite sides of the vehicle into and from which the cameras are displaced by the actuators. Such housings may be formed by wells in the opposite sides of the vehicle body, as will be seen, and locking doors may be provided to close such wells when the cameras are retracted into the wells. The cameras may be supported on linkages in the wells.

It is yet another object to provide terminal screen mounting means including actuator means to raise and lower the screens, within the vehicle interior, said actuator means carried by the vehicle.

These and other objects and advantages of the invention, as well as the details of an illustrative embodiment, will be more fully understood from the following specification and drawings, in which:

DRAWING DESCRIPTION

FIG. 1 is a top plan view of a vehicle incorporating the invention;

FIG. 2 is an enlarged elevation, looking forwardly, showing mounting of a video camera;

FIG. 3 is a top plan view taken on lines 3—3 of FIG. 2;

FIG. 4 is an elevation showing mounting of CRT screens;

FIG. 5 is a block diagram showing a control system;

FIG. 6 shows a swivel path of the camera lens; and

FIG. 7 shows a modified CRT arrangement.

DETAILED DESCRIPTION

In FIG. 1 a vehicle 10 such as a passenger automobile has a top or roof 11, left and right side windows 12-15 on doors 16-19, an engine hood 20, and body side walls 21 and 22 forward of the front doors. First and second video cameras 23 and 24 are provided at the left and right sides of the vehicle and are mounted with their lenses or lens openings 25 and 26 facing generally rearwardly to scan traffic and other conditions at the vehicle rear. Note the rearward direction of viewing indicated by broken lines 25a and 26a. First and second video display terminals 27 and 28, with video screens 27a and 28a, are respectively connected with the cameras, as by leads indicated at 30 and 31 to display the areas viewed by the video cameras.

First and second means are provided to mount the cameras to the vehicle at the respective opposite sides 21 and 22 thereof, for example. The cameras are to be mounted relatively lower on a truck body, and relatively higher on a passenger vehicle body. The mounting means are generally indicated at 34 and 35, and are to provide for swiveling of the cameras, side to side if the cameras are mounted on a passenger car, and both side to side, and up and down if mounted on a truck chassis, which stands generally higher than an auto body.

FIGS. 2 and 3 show one such mounting means 34 for the left side (the right side being the same). The mounting means 34 includes an actuator 36 operatively connected with the camera 23 to move at horizontally, away from the side 20 of the vehicle, i.e. from retracted position in a well 37 in the vehicle body as seen in FIG. 3, to an extended position outwardly of the well, is seen in FIG. 2. The actuator includes a drive 36a, and an extensible link 36b movable leftwardly and rightwardly by the drive. For this purpose, the camera may be carried by a parallelogram linkage including links 39-42, hinged at 43-46, as seen in FIG. 2. The linkage hods the camera body 23 oriented in the same neutral (unswiveled) position as it extends and retracts, the hinges allowing link pivoting about vertical axes.

A protective door 47 is hinged at 48 to the auto body, to swing about a vertical axis 49, and a drive 50' on the auto body rotates the door open and closed (locked) as controlled by master control 50 seen in FIG. 5. Note connections 51 and 52 from 50' to the door drives 50. When closed, the doors cover the entrances to the wells 37, and protect (lock) the retracted cameras in the wells. The actuator drives 36a are connected at 53 and 54 with the master control 50. The connections are such that when the vehicle operator turns his ignition key "ON" and also turns a control switch 60 "ON", the control 50 is energized by the vehicle battery and causes the door 47 to open, and the cameras then are bodily extended from the vehicle body, as into FIG. 2 position, by operation of the door drives and camera mount actuators 36. Other equivalent structures may be provided for these purposes. In door closed position, the doors may be flush with the opposite sides of the vehicle. If switch 60 is not turned to "ON" position, the cameras are not deployed, as described (as during bad weather or during idling).

The screens display the scenes or views, as "viewed" by the cameras, existent at th rear of the vehicle and at both sides thereof. The screens are shown at locations in front of the driver, i.e. to the front of the steering wheel 62. For this purpose the terminals may be mounted on, near, or of in association with dash board 63. The terminals are mounted as by third and fourth mounting means indicated at 64 and 65. Actuators 66 and 67 may be provided to move the mounting means 64 and 65 and terminals up and down, as between lowered positions seen at 27' and 28", to full line positions 27 and 28, in FIG. 4. Thus, when switch 60 is turned "ON", the actuators are energized by the control 50 to elevate or deploy the screens to raised position. See connections at 68 and 69 from the actuators to the control 50.

In accordance with an important aspect of the invention, at least one of the first and second mounting means (and preferably both) for the cameras include swiveling means to swivel one or both cameras in at least one of the following modes:

(i) up and down (ii) side to side as during camera operation, whereby a full, wide and complete view of road conditions to the rear of the vehicle is realized. See for this purpose "up-down" swivel actuator 70 connected at 71 to the camera gimble 72, swiveled at 73 to a horizontal stub axle 74 on linkage 39–42, to swivel the gimble and the camera 23 about a horizontal axis. Actuator 70 is mounted on the linkage. See also side-to-side swivel actuator 80 mounted on gimble 72 and connected at 81 to the camera to rotate at about vertical axis 83 defined by the gimble. The actuators 70 and 80 are controlled by control 50 to swivel to camera up and down and from side to side. See for example FIG. 6 showing the camera lens 25 moved along a sinusoidal path 85 during up and down, and side to side slewing, the lens moving from left to right in FIG. 6, and then moved back to the left along the same path. See connections 87 and 88 between the drives 70 and 80 and the control. Such slewing control is programmed into the master control. For passenger vehicles, the programming may be such as to only swivel the camera side to side, i.e. omitting up-down swivel.

Ignition key circuit connection to control 50 is seen at 90, in FIG. 5.

The cameras an CRT's themselves are also energized, automatically and electrically, when switch 60 is turned "ON", as via leads 92 and 93.

FIG. 3 also shows an auxiliary rear view mirror 110 mounted at 111 at the side of the vehicle. The body 112 of the mirror is metallized as at 113 so as to pass light through the mirror (see ray 114) to the camera, and also to reflect light (see ray 115) toward the driver. Thus, the mirror permits the driver to observe conditions at the vehicle rear, in the normal manner, when the video camera is not operating; yet it does not obstruct or interfere with camera operation. Therefore, what the mirror "sees" is what the camera sees, in one camera position. The mirror is pivotable at 111. The use of the mirror is optional.

It should be noted that the camera and CRT's can be connected to the engine ignition so as to be switched on and off, as the ignition is switched on and off.

The cameras need not be retracted into housings in the vehicle body, but can be (as described above) if required for any application, if cost justifies. Camera swiveling up and down is primarily for large or heavy vehicles, such as trucks, buses, semi-trailers, etc. For passenger cars, only one camera and screen is an option. The cameras can optionally be mounted to or in the forward fender areas of the vehicle. Cameras could also be mounted on or in conjunction with the mirror or mirrors.

FIG. 7 shows a modified CRT arrangement, using one CRT 150 with two screen sections 151 and 152, i.e. left "L" and right "R" sections. The left and right video cameras 23 and 24 are connected to the one CRT 150, and the latter's circuitry operates to portray the camera transmitted views onto screen sections 151 and 152.

Applicant claims the benefit of Disclosure Document No. 193,843.

We claim:

1. Apparatus to permit viewing of traffic conditions to the rear and side of a motor vehicle, which has opposite sides, comprising:
   (a) first and second video cameras and first and second display terminals having video screens, the cameras connected to the screens, respectively,
   (b) first and second means mounting the first and second cameras to the vehicle at the respective opposite sides thereof, the cameras directed generally toward the rear of the vehicle,
   (c) and third an fourth means mounting the screens to the vehicle proximate the driver's position, to be viewed by the driver in said position.

2. The combination of claim 1 wherein at least one of said first and second mounting means includes swiveling means to swivel the associated camera in at least one of the following modes:
   (i) up and down
   (ii) side to side during operation of that camera.

3. The combination of claim 1 wherein each of the first and second mounting means including swiveling means to swivel the associated camera in at least one of the following modes:
   (i) up and down
   (ii) side to side 4. The combination of claim 1 wherein said third and fourth means include actuator means to raise and lower said screens, within the vehicle interior, said actuator means carried by the vehicle.

5. The combination of claim 1 including at least one rear-view mirror mounted at a side of the vehicle, and in operative association with at least one of said video cameras.

6. The combination of claim 5 wherein the mirror is metallized to pass light therethrough to the camera, and also to reflect light toward the vehicle driver, in the vehicle.

7. The combination of claim 1 wherein said first and second mounting means include actuators connected with the cameras to bodily move the cameras toward and away from the sides of the vehicle.

8. The combination of claim 7 wherein the mounting means include linkages supporting the cameras for said bodily movement by the actuators.

9. The combination of claim 7 including respective housings at opposite sides of the vehicle into and from which the cameras are displaced by the actuators.

10. The combination of claim 9 wherein said housings are defined by wells in the sides of the vehicle.

11. The combination of claim 10 wherein said housings have doors, and including door actuators controllable by the driver, within the vehicle, to open and close the doors relative to the wells.

12. In combination:
(a) a vehicle having a side, and a driver compartment,
(b) a video camera mounted at the vehicle side to scan conditions at the rear of the vehicle,
(c) a video display unit having a screen observable by the driver as he faces forwardly, in said compartment, said unit operatively connected with the camera to display what is scanned by the camera,
(d) and a rear view mirror mounted at the side of the vehicle to pass light to the camera and to reflect light to the passenger compartment for viewing by the driver.

13. Apparatus to permit viewing of traffic condition to the rear and side of a motor vehicle, which has opposite sides, comprising
(a) first and second video cameras and display terminal CRT means having two video screen portions, the cameras connected to the CRT mean so that one screen portion display output from one camera, and the other screen portion display output from the other cameras,
(b) first and second means mounting the first and second cameras to the vehicle at the respective opposite sides thereof, the cameras directed generally toward the rear of the vehicle,
(c) and means mounting the CRT means to the vehicle for viewing of said screen portions by the driver in the vehicle.

14. Apparatus to permit viewing of traffic conditions to the rear and side of a motor vehicle, which has opposite sides, comprising
(a) video camera means mounted to the side of the vehicle and directed rearwardly at said side, and CRT means connected to the camera to display its output on a screen to be viewed by the driver,
(b) and driver means connected to the camera means to substantially constantly swivel the camera means in at least one of the following modes:
(i) up and down
(ii) side to side
during operation of that camera means.

* * * * *